Figure 1:
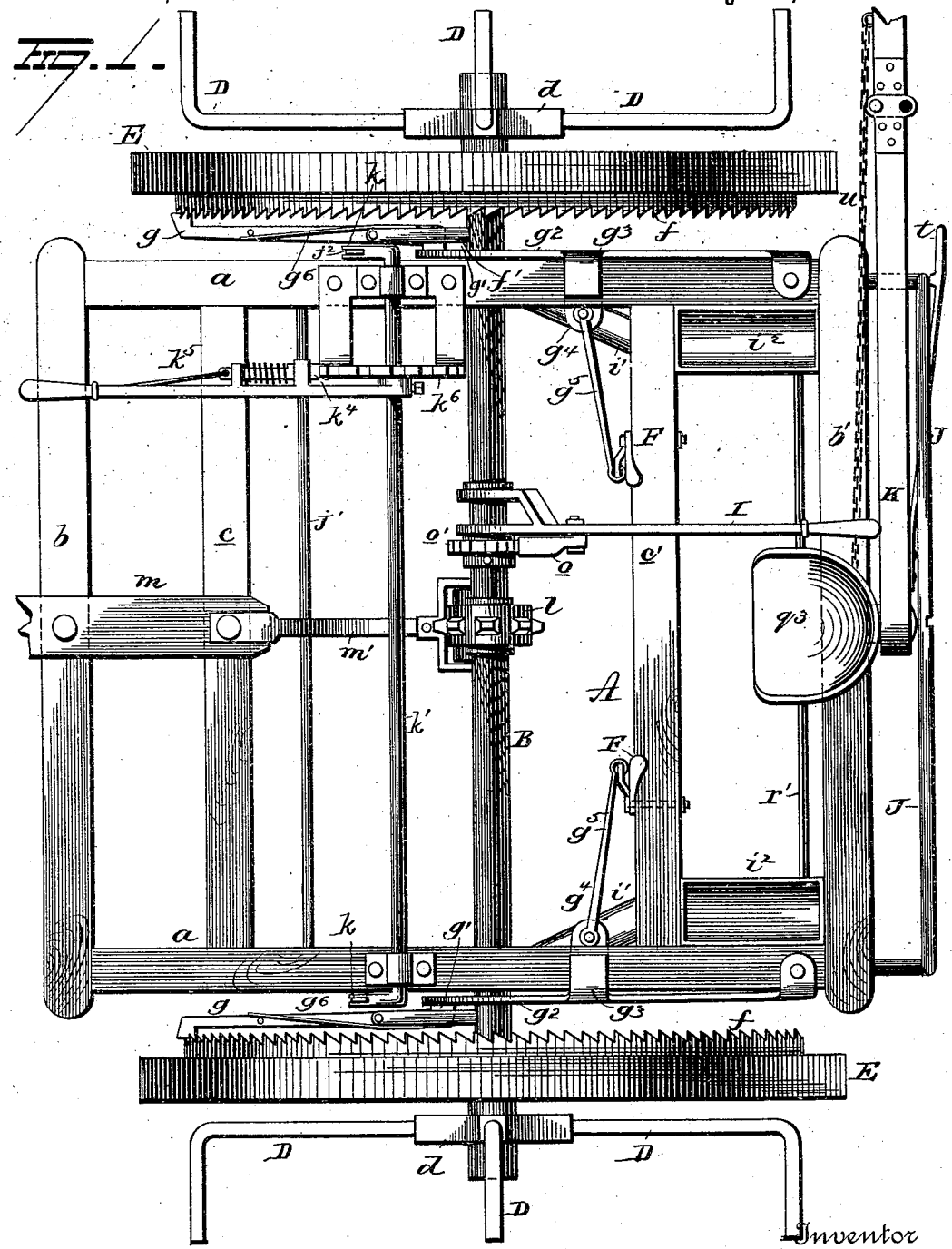

(No Model.) 2 Sheets—Sheet 2.
B. DEARDORFF.
CORN PLANTER.
No. 475,266. Patented May 17, 1892.
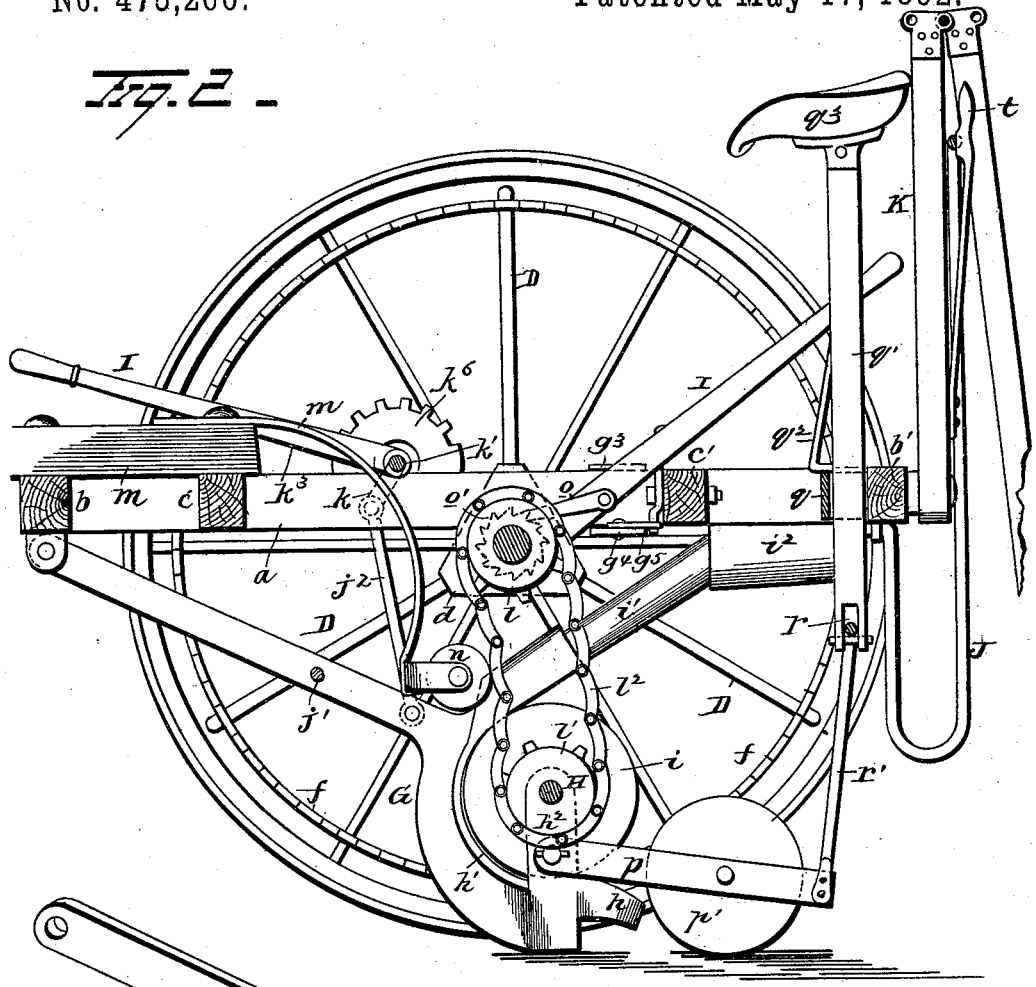
Fig. 2.
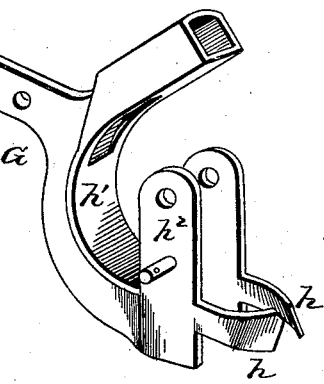
Fig. 3.
Fig. 4.
Witnesses
E. J. Nottingham
G. F. Downing
Inventor
Benton Deardorff
By H. A. Symmor
Attorney
THE NORRIS PETERS CO., PHOTO-LITHO., WASHINGTON, D. C.

UNITED STATES PATENT OFFICE.

BENTON DEARDORFF, OF HAGERSTOWN, INDIANA, ASSIGNOR OF TWO-THIRDS TO JOHN H. KIDWELL AND WILLIAM G. MATHEWS.

CORN-PLANTER.

SPECIFICATION forming part of Letters Patent No. 475,266, dated May 17, 1892.

Application filed March 21, 1891. Serial No. 385,855. (No model.)

*To all whom it may concern:*

Be it known that I, BENTON DEARDORFF, a citizen of Hagerstown, in the county of Wayne and State of Indiana, have invented certain new and useful Improvements in Corn-Planters; and I do hereby declare the following to be a full, clear, and exact description of the invention, such as will enable others skilled in the art to which it appertains to make and use the same.

My invention relates to an improvement in corn-planters, and more particularly to check-row planters, its object being to produce a check row planter which shall be comparatively simple in construction, as well as durable and which shall be effectual in the performance of its functions.

It consists in certain novel features of construction and combination and arrangements of parts, as hereinafter set forth, and pointed out in the claims.

In the accompanying drawings, Figure 1 is a plan view of the machine. Fig. 2 is a longitudinal sectional view. Figs. 3 and 4 are views of certain details.

A represents a frame composed of side bars $a\,a$, front and end bars $b\,b'$, and front and rear cross-bars $c\,c'$. This frame is mounted on an axle B, and to the ends of the latter disks $d$ are secured, said disks each carrying a series of three (or more) marking-fingers D, which markers will be hereinafter more particularly referred to.

Mounted loosely on the axle B in proximity to the markers D are carrying-wheels E, each of which is provided on its inner side with ratchet-teeth $f$. A pin $f'$ is secured to the axle near each wheel E, and has a dog $g$ pivotally connected to it at a point between its ends. Said dogs $g$ are adapted at their upper ends to engage the ratchet-teeth $f$, and at their other ends each dog is provided with a projection $g'$, adapted to be engaged by a spring-lever $g^2$, secured to the side bars $a$ of the frame, said lever $g^2$ being preferably formed to embrace the axle and each provided with an arm $g^3$, adapted to rest upon the side bars $a$ and serve to guide or limit the levers in their movements. Each lever $g^2$ is also provided with an ear $g^4$, to which a rod $g^5$ is attached, the other ends of said rods being connected with one arm of a bell-crank foot-lever F, connected to the cross-bar $c'$ of the frame. The dog $g$ is maintained normally in engagement with the ratchet-teeth by means of a spring $g^6$, carried by the pin $f'$. By this construction it will be seen that the wheels and markers will be made to rotate together when the machine moves forward and that the dog $g$ may be readily withdrawn from engagement with the ratchet-teeth $f$ by operating the foot-lever F when it is desired to turn the machine or when the markers get behind the marks of the previous row.

Pivotally connected at their forward ends to the forward end of the frame A are the hoes G, said hoes being flared outwardly for the passage of the grain and each provided with rearwardly-extending fingers or coverers $h$, said fingers being preferably bent inwardly toward each other. Each hoe G is provided with a semicircular plate or flange $h'$, said plates or flanges terminating at their lower ends within the flared portions of the hoes. Arms or ears $h^2$ project from the hoes in lines parallel with the radius of the semicircular plates $h'$, and mounted in these ears are the ends of a shaft H.

Mounted on the ends of the shaft H and adapted to rotate within the semicircular plates $h'$ are feeding-wheels $i$, said wheels being provided with a series of sockets $j$, corresponding in number with the number of markers D, and adapted to receive corn through a chute $i'$, said chute communicating with grain-receptacles $i^2$, carried by the frame A. In the sockets $j$ screws are preferably inserted to regulate their depth and adapt them to receive a greater or less number of grains of corn, according to the depth to which said screws are inserted in the sockets. The hoes G are connected at points between their ends by means of a brace or rod $j'$. Also connected to said hoes, preferably at points near the feeding-wheels $i$ are arms or links $j^2$, said links being connected at their upper ends to the crank-arms $k$ at the ends of a shaft $k'$, mounted on the frame A.

Secured rigidly on the shaft $k'$ is a lever $k^3$, carrying a catch $k^4$ and finger-bar $k^5$, said catch being adapted to engage a toothed segment $k^6$, secured to the frame. By means of this lever the shaft $k'$ may be actuated to raise and lower the hoes.

Located on the axle B is a sprocket-wheel $l$, and located on the shaft H, immediately beneath the sprocket-wheel $l$, is another sprocket-wheel $l'$. Over these sprocket-wheels a sprocket chain or belt $l^2$ is passed, whereby motion will be transmitted to the feeding-wheels $i$.

Secured to the inner end of the tongue $m$ or to the frame A is a spring-arm $m'$, adapted at its lower end to carry a roller $n$ to bear against the sprocket chain or belt $l^2$ to compensate for the varying tension of the belt or chain as the hoes are raised and lowered.

Mounted on the axle B is a lever I, carrying a dog $o$, adapted to engage a ratchet-wheel $o'$ on the axle B. By this lever the axle may be rotated when the markers get too far ahead, or, in other words, when the markers rotate too fast and fail to mark the ground in line with the last row of marks.

Detachably connected to the hoes G are rearwardly-extending arms or frames $p$, in which covering-wheels $p'$ are mounted.

Secured to the rear cross-bar $b'$ of the frame A is a bracket or socket-piece $q$, through which a seat-post $q'$ is passed, and provided with a spring-actuated support $q^2$, adapted to rest on the bracket $q$, and thus sustain the weight of the driver in the seat $q^3$. A notch or recess $r$ is made in the lower end of the seat-post for the reception of a spring bar or rod $r'$, connected at its ends to the truck-frames $p$. With this construction the spring-support $q^2$ may be released and the weight of the driver allowed to be brought to bear upon the spring rod or bar $r'$, and consequently upon the covering-wheels.

Secured to the end of the frame A is a segmental frame J, preferably of metal, and pivotally connected to the end bar $b'$ and adapted to be guided by said frame J is a gage K, said gage-rod being provided with a spring-catch $t$, adapted to enter a notch in the frame J and maintain the gage in an elevated position when not in use. The gage is preferably made in two sections pivotally connected together, whereby it may be folded when not in use. The pin connecting the two sections of the gage is preferably made of wood or other material easy to be broken, so that when the gage is in a horizontal position, as in use, and should come into contact with some unyielding obstruction the pin connecting the two parts of the gage will be broken, and thus prevent injury to the gage itself. A chain $u$ will preferably be attached at one end to the seat-post and at the other end to the gage, whereby it may be readily manipulated by the driver. By thus constructing the machine the rows will be properly marked by the markers, said markers will be maintained in their proper positions and regulated by the devices above described, the grain will be deposited on the ground uniformly, the feeding mechanism operating in unison with the markers, and the machine will be completely in control of the operator and its accurate operation thus insured.

The machine may be manufactured with comparatively little expense and its construction made durable.

Slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

1. In a corn-planter, the combination, with a frame, of a hoe connected thereto, said hoe having a curved rear edge, ears projecting from said hoe, a feed-wheel having sockets therein mounted in said ears, means for supplying grain to said feed-wheel, and means for rotating said feed-wheel, substantially as set forth.

2. In a corn-planter, the combination, with a frame, an axle, and wheels thereon, of a series of markers secured to the ends of said axle, hoes connected to said frame, feeding-wheels carried by said hoes, and means for rotating said feeding-wheels, said feeding-wheels being provided with a series of sockets corresponding with the number of markers on the respective ends of the axle, substantially as set forth.

3. In a corn-planter, the combination, with a frame, an axle, and carrying wheels, of hoes connected to said frame, feeding-wheels carried by said hoes and having sockets for the reception and delivery of corn, a shaft connecting said feeding-wheels, and a sprocket-chain connecting said shaft and axle for communicating motion from one to the other, substantially as set forth.

4. In a corn-planter, the combination, with a frame, of hoes connected thereto, feeding-wheels carried by said hoes, and covering-wheels carried by said hoes in rear of the feeding-wheels, substantially as set forth.

5. In a corn-planter, the combination, with a frame, of hoes connected thereto, feeding-wheels carried by said hoes, frames detachably connected to said hoes, and covering-wheels carried by said detachable frames, substantially as set forth.

6. In a corn-planter, the combination, with a frame, of hoes connected thereto, covering-frames carried by said hoes, covering-wheels carried by said frames, a seat-post carrying a seat, an adjustable support for said seat-post, and a spring-rod connecting the truck-frames and adapted to bear against the seat-post, whereby the weight of the driver may be brought to bear on the covering-wheels, substantially as set forth.

7. The combination, with a corn-planter, of a gage pivoted at one end to the planter, said gage being made in sections and connected together by means of a pin capable of being easily broken, and a flexible connection by which the gage may be raised and lowered, substantially as and for the purpose set forth.

8. The combination, with the axle having a sprocket-wheel thereon, pivoted hoes, feed-wheels, sprocket-wheel connected with the latter, and a sprocket-chain passing around these sprocket-wheels, of a spring-arm having a roller thereon adapted to bear on the sprocket-chains to keep them taut, substantially as set forth.

9. The combination, with main frame, tongue, and axle, of hinged hoes, feed-wheels, sprocket-wheels, chain, and a spring-arm secured to the rear end of the tongue and provided with a roller adapted to bear on the sprocket-chain, substantially as set forth.

In testimony whereof I have signed this specification in the presence of two subscribing witnesses.

BENTON DEARDORFF.

Witnesses:
JOHN H. REPLOGLE,
TERRY S. WALKER.